United States Patent
Grisenthwaite (10) Patent No.: US 11,461,243 B2
(45) Date of Patent: Oct. 4, 2022

(54) SPECULATIVE CACHE STORAGE REGION

(71) Applicant: Arm Limited, Cambridge (GB)

(72) Inventor: Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 30 days.

(21) Appl. No.: 16/959,280

(22) PCT Filed: Aug. 30, 2018

(86) PCT No.: PCT/GB2018/052449
§ 371 (c)(1),
(2) Date: Jun. 30, 2020

(87) PCT Pub. No.: WO2019/138206
PCT Pub. Date: Jul. 18, 2019

(65) Prior Publication Data
US 2021/0056043 A1    Feb. 25, 2021

(30) Foreign Application Priority Data

Jan. 10, 2018 (GB) ...................................... 1800357

(51) Int. Cl.
*G06F 12/00* (2006.01)
*G06F 12/126* (2016.01)
(Continued)

(52) U.S. Cl.
CPC ........ *G06F 12/126* (2013.01); *G06F 9/30047* (2013.01); *G06F 9/30196* (2013.01);
(Continued)

(58) Field of Classification Search
CPC .. G06F 12/0873; G06F 9/544; G06F 12/0246; G06F 2212/202
See application file for complete search history.

(56) References Cited

U.S. PATENT DOCUMENTS 6,321,328 B1 *  11/2001  Karp ................... G06F 9/30043
                                                            712/225
7,409,500 B2 *   8/2008  Steely, Jr. ........... G06F 9/30181
                                                            712/216
(Continued)

FOREIGN PATENT DOCUMENTS

| GB | 2 451 199   | 1/2009  |
| JP | 63-292255   | 11/1988 |
| JP | 2013-537334 | 9/2013  |

OTHER PUBLICATIONS

Page D: "Partitioned Cache Architecture as a Side-Channel Defence Mechanism",International Association for Cryptologic Research,vol. 20050825:073958, Aug. 22, 2005 (Aug. 22, 2005), pp. 1-14, XP061001404, [retrieved on Aug. 22, 2005] (Year: 2005).*

(Continued)

*Primary Examiner* — Shawn X Gu
*Assistant Examiner* — Mohammad S Hasan
(74) *Attorney, Agent, or Firm* — Nixon & Vanderhye P.C.

(57) ABSTRACT

An apparatus (2) comprises processing circuitry (4) to perform speculative execution of instructions; a main cache storage region (30); a speculative cache storage region (32); and cache control circuitry (34) to allocate an entry, for which allocation is caused by a speculative memory access triggered by the processing circuitry, to the speculative cache storage region instead of the main cache storage region while the speculative memory access remains speculative. This can help protect against potential security attacks which exploit cache timing side-channels to gain information about allocations into the cache caused by speculative memory accesses.

24 Claims, 4 Drawing Sheets

(51) Int. Cl.
*G06F 9/30* (2018.01)
*G06F 12/0811* (2016.01)
*G06F 12/0846* (2016.01)
*G06F 12/0871* (2016.01)
*G06F 12/0875* (2016.01)
*G06F 12/128* (2016.01)

(52) U.S. Cl.
CPC ...... *G06F 12/0811* (2013.01); *G06F 12/0848* (2013.01); *G06F 12/0871* (2013.01); *G06F 12/0875* (2013.01); *G06F 12/128* (2013.01); *G06F 2212/507* (2013.01)

(56) References Cited

U.S. PATENT DOCUMENTS

| | | | | |
|---|---|---|---|---|
| 8,943,273 | B1* | 1/2015 | Jamil | G06F 12/0804 |
| | | | | 712/218 |
| 2003/0233613 | A1 | 12/2003 | Ash et al. | |
| 2005/0154805 | A1 | 7/2005 | Steely, Jr. et al. | |
| 2007/0266199 | A1* | 11/2007 | Peled | G06F 12/0842 |
| | | | | 711/E12.039 |
| 2014/0156933 | A1 | 6/2014 | Shaikh et al. | |
| 2014/0189253 | A1 | 7/2014 | Mohandru et al. | |
| 2015/0006821 | A1 | 1/2015 | Gara et al. | |
| 2015/0149733 | A1 | 5/2015 | Rozas et al. | |
| 2015/0378731 | A1 | 12/2015 | Lai et al. | |
| 2016/0019158 | A1* | 1/2016 | Palacharla | G06F 12/084 |
| | | | | 711/129 |
| 2017/0091108 | A1* | 3/2017 | Arellano | G06F 13/4282 |
| 2018/0097728 | A1* | 4/2018 | Bodi Reddy | H04L 45/742 |
| 2018/0113789 | A1* | 4/2018 | Mola | G06F 11/3636 |
| 2018/0285105 | A1* | 10/2018 | Wang | G06F 9/3834 |
| 2018/0373646 | A1* | 12/2018 | Shwartz | G06F 12/0875 |
| 2019/0129716 | A1* | 5/2019 | Calciu | G06F 12/0868 |

OTHER PUBLICATIONS https://web.archive.org/web/20171230124337/https://en.wikipedia.org/wiki/Central_processing_unit (Year: 2017).*
"Arm Processor Security Update", Arm Developer, Jan. 3, 2018, 6 pages.
Richard Grisenthwaite, "Cache Speculation Side-channels", Arm, Whitepaper, Jan. 2018, 13 pages.
D. Page, "Partitioned Cache Architecture as a Side-Channel Defence Mechanism", International Association for Cryptologic Research, vol. 20050825:073958, Aug. 22, 2005, 14 pages.
Yinqian Zhang, et al., "Diippel: Retrofitting Commodity Operating Systems to Mitigate Cache Side Channels in the Cloud", Computer & Communications Security, ACM, Nov. 4-8, 2013, pp. 827-837.
Combined Search and Examination Report for GB Application No. 1800357.4 dated Jun. 21, 2018, 6 pages.
International Search Report and Written Opinion of the ISA for PCT/GB2018/052449 dated Nov. 16, 2018, 16 pages.
Office Action for EP Application No. 18765999.0 dated Jun. 2, 2022, 7 pages.
Office Action for JP Application No. 2020-537167 dated Jul. 5, 2022 and English translation, 11 pages.

* cited by examiner

SPECULATIVE CACHE STORAGE REGION

This application is the U.S. national phase of International Application No. PCT/GB2018/052449 filed Aug. 30, 2018 which designated the U.S. and claims priority to GB Patent Application No. 1800357.4 filed Jan. 10, 2018, the entire contents of each of which are hereby incorporated by reference.

The present technique relates to the field of data processing.

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also some systems may support load speculation where the value loaded from memory is predicted before the real value is actually returned from the memory, to allow subsequent instructions to be processed faster. Other forms of speculation are also possible.

At least some examples provide an apparatus comprising:
processing circuitry to perform speculative execution of instructions;
a main cache storage region;
a speculative cache storage region; and
cache control circuitry to allocate an entry, for which allocation is caused by a speculative memory access triggered by the processing circuitry, to the speculative cache storage region instead of the main cache storage region while the speculative memory access remains speculative, in which:
when the speculative memory access which triggered allocation of the entry to the speculative cache storage region is a speculative load memory access for loading data from a memory system, the entry allocated to the speculative cache storage region in response to the speculative load memory access specifies the data loaded from the memory system.

At least some examples provide a method for an apparatus comprising processing circuitry to perform speculative execution of instructions; a main cache storage region; and a speculative cache storage region, comprising:
in response to a speculative memory access triggered by the processing circuitry, allocating an entry to the speculative cache storage region instead of the main cache storage region while the speculative memory access remains speculative, in which:
when the speculative memory access which triggered allocation of the entry to the speculative cache storage region is a speculative load memory access for loading data from a memory system, the entry allocated to the speculative cache storage region in response to the speculative load memory access specifies the data loaded from the memory system.

At least some examples provide an apparatus comprising:
processing circuitry to perform speculative execution of instructions;
an instruction decoder to decode instructions to control operation of the processing circuitry depending on the decoded instructions; in which:
the instruction decoder is responsive to a speculative cache flush instruction to control the processing circuitry to discard or make inaccessible, from a cache, one or more speculative entries allocated to the cache in response to a speculative memory access which still remains unresolved or has been resolved as incorrect.

At least some examples provide a data processing method comprising:
decoding instructions to control operation of processing circuitry depending on the decoded instructions;
performing speculative execution of instructions using the processing circuitry; and
in response to decoding of a speculative cache flush instruction, controlling the processing circuitry to discard or make inaccessible, from a cache, one or more speculative entries allocated to the cache in response to a speculative memory access which still remains unresolved or has been resolved as incorrect.

Further aspects, features and advantages of the present technique will be apparent from the following description of examples, which is to be read in conjunction with the accompanying drawings, in which.

An apparatus has processing circuitry for performing speculative execution of instructions, a main cache storage region, a speculative cache storage region, and cache control circuitry for allocating an entry, for which allocation is caused by a speculative memory access triggered by the processing circuitry, to the speculative cache storage region instead of the main cache storage region while the speculative memory access remains speculative. When the speculative memory access which triggered allocation of the entry to the speculative cache storage region is a speculative load memory access for loading data from a memory system, the entry allocated to the speculative cache storage region in response to the speculative load memory access may specify the data loaded from the memory system.

By providing a separate speculative cache storage region to which entries can be allocated when they relate to speculative memory accesses whose speculation outcome has not yet been resolved as correct or incorrect, this avoids polluting the main cache storage region with entries associated with addresses speculatively accessed by the processing circuitry. This helps to protect against potential security attacks which could otherwise exploit the property that the effects of speculatively executed instructions may persist in the cache even after any architectural effects of the speculatively executed instructions have been reversed following a misspeculation. Such attacks may train branch predictors or other speculation mechanisms to trick more privileged code into speculatively executing a sequence of instructions designed to make the privileged code access a pattern of memory addresses dependent on sensitive information, so that less privileged code which does not have access to that sensitive information can use cache timing side-channels to probe which addresses have been allocated to, or evicted from, the cache by the more privileged code, to give some information which could allow the sensitive information to be deduced. By providing a speculative cache storage region separate from the main cache storage region, so that entries can be allocated to the speculative cache storage region while their corresponding memory access remains speculative, this means that allocation of speculative results does not affect the addresses for which entries are cached in the main cache storage region, reducing the side-channel information which can be gained from measuring cache access timings, and hence limiting the opportunity for the type of attack described above. The cache control circuitry may exclusively allocate to the main cache storage region entries corresponding to non-speculative memory accesses or entries corresponding to speculative memory accesses which have already been resolved as correct.

The speculative cache storage region may be used for entries allocated in response to a speculative load memory accesses (for loading data from a memory system). The use of a separate speculative cache storage region for storing data loaded speculatively from a memory system would be seen as counter-intuitive by a skilled person in the field of data processing systems, as a speculative operation which merely reads data from memory (but does not update the data) would normally be allowed to allocate entries in the main cache, since even if the speculation was incorrect, the cached data would still be correct as the speculative load does not modify the data. However, by allocating an entry for a speculative load operation in the speculative cache storage region instead of the main cache storage region, this avoids exposing information on the addresses accessed speculatively, and so reduces the risk of the cache timing side-channel attacks of the type discussed above.

The speculative cache storage region could also be used for entries allocated to the cache in response to speculative store memory accesses (for storing data to a memory system). Alternatively, a separate store buffer provided in the micro-architecture of a processing pipeline may buffer speculative store data prior to writing data to the cache, in which case it may not be needed to use the speculative cache storage region in response to store memory accesses.

Both the main and speculative cache storage regions may be accessible in response to reads (loads) triggered by speculative instructions executed by the processing circuitry. Hence the performance benefits of caching the data loaded speculatively may still be achieved. An alternative approach for resolving the type of attack discussed above may be to prohibit caching of speculative entries altogether until the speculation is resolved, but this would harm performance as it would mean that a subsequent instruction requiring the same data as a previous speculative memory access would not be able to read cached data until the earlier memory access has been resolved, causing a delay. By instead providing a dedicated speculative cache storage region so that speculative entries can be distinguished from non-speculative entries in the main cache storage region, but still making both the main and speculative caches accessible, this helps to improve performance.

In response to the processing circuitry switching from a more privileged state to a less privileged state, the cache control circuitry may discard entries of the speculative cache storage region or make the entries of the speculative cache storage inaccessible to the processing circuitry. This avoids code associated with the less privileged state being able to gain side-channel information relating to the effects of cache allocations caused by incorrectly speculated instructions. On the other hand, the entries in the main cache storage region may remain accessible in the less privileged state, but as the main cache storage region has not been polluted with allocations which are still to be resolved following a speculation, the attacker cannot gain any information on instructions speculatively executed following an incorrect prediction, and so cannot use this as a way of causing the more privileged state to leak sensitive information. Hence, this avoids the type of security attack discussed above.

The cache control circuitry may transfer an entry allocated in response to a speculative memory access from the speculative cache storage region to the main cache storage region after the speculative memory access has been resolved as correct. This transfer could be performed directly in response to detecting that the speculative memory access has been resolved as correct, or could be performed at a later time.

For example, in some implementations, rather than transferring an entry immediately as soon as the corresponding access which allocated the entry is resolved, the cache control circuitry may periodically perform a speculative cache transfer operation, in which it is determined whether any entries of the speculative cache storage region correspond to resolved speculative memory accesses which have been resolved as correct, and if so, the entries corresponding to the resolved speculative memory accesses are transferred to the main cache storage region. This periodic approach may be simpler to implement (more area- and power-efficient) in some implementations. For example, rather than tracking at an individual instruction by instruction level which entries in the speculative cache storage region correspond to particular memory access instructions, an epoch-based approach may be used, in which the resolution of speculative instructions may be tracked at a more coarse-grained granularity, e.g. in blocks (epochs) of a certain number of instructions. For example, each entry of the speculative cache storage region could comprise metadata specifying an identifier of the epoch (block of instructions) which caused that entry to be allocated, and when all the instructions of a given epoch have been determined to be resolved as correctly speculated, any entries specifying the identifier of that epoch could then be transferred to the main cache storage region.

Hence, there may be a trade off between the precision with which entries and instructions can be resolved as correctly speculated and the performance and area overhead of tracking this. Nevertheless, in general by transferring entries from the speculative cache storage region to the main cache storage region once it has been determined that the corresponding memory accesses were correctly speculated, the transferred entries can then remain accessible in the main cache even if a subsequent speculation fails and so entries are discarded from the speculative cache storage region. This transfer also makes entries of the speculative cache storage region available for reallocation to other speculative memory operations.

Note that, at the point when an entry is transferred from the speculative cache storage region to the main cache storage region, the data value to be cached in that entry may not yet be stored within the transferred entry. For example, for some entries, the memory access which allocated the entry may be resolved as correct before the actual data value to be loaded into that entry is received from a further cache or memory. The cache control circuitry may have a cache linefill mechanism which may, on receipt of a previously requested data value from a further cache or memory, may lookup both the speculative cache storage region and the main cache storage region to identify which entry should be updated with the data value returned in response to a cache linefill request, as the entry to be updated could be present in either the main or speculative cache storage region depending on the relative timing of the resolution of whether the speculation on the memory access was correct and the response to the cache linefill request being received.

In some implementations, an entry of the speculative cache storage region associated with a given speculative memory access can be discarded if the speculative memory access is resolved as incorrect. For example, when a branch is determined to be mispredicted, an entry of the speculative cache storage region which was allocated in response to a memory access instruction following the mispredicted branch may be discarded. Again, this discarding could be performed directly in response to detection that the corresponding speculative memory access was resolved as incorrect, or could be performed later in a periodic checking operation to check whether any entries relate to incorrectly speculated memory accesses.

Alternatively, in some cases the discarding of entries from the speculative cache storage region could be performed independent of any knowledge of whether particular memory accesses were resolved as incorrectly speculated. For example, the type of security attack discussed above may only be a risk if there is a switch from more trusted to less trusted code. If processing remains within more trusted code then there may not be any problem with being able to access still to be resolved speculative entries within the cache. In fact, while remaining within code at a given level of trust, it may be beneficial for performance to keep the still-to-be-resolved speculative entries in the speculative cache storage region, to reduce access times for subsequent accesses to the same data. Hence, in some cases the entries in the speculative cache storage region may remain until a speculative cache flush event occurs.

The cache control circuitry may be responsive to a speculative cache flush event to discard at least the entries of the speculative cache storage region which are associated with either speculative memory accesses which have been resolved as incorrect, or speculative memory access accesses which are still to be resolved. If the speculative cache storage region is able to distinguish entries which relate to already resolved memory accesses then it is not essential to discard these entries. Nevertheless, in some implementations when the speculative cache flush event occurs, the cache control circuitry may simply discard all the entries of the speculative cache storage region. This may reduce overhead of recording metadata in each entry of the speculative cache storage region for tracking the speculation outcome of the corresponding memory accesses which allocated the entry.

Different types of speculative cache flush event may be defined for triggering discarding of entries from the speculative cache storage region. In general the speculative cache flush event could be any event which signals that there could be a risk that code executed after the speculative cache flush event could gain access to information associated with code executed before the speculative cache flush event if the results of still-to-be-resolved speculative memory accesses were to remain accessible after the speculative cache flush event.

For example the speculative cache flush event may comprise a switch of privilege level by the processing circuitry. For example the processing circuitry switching between more and less privileged states could be treated as a flush event and trigger discarding of at least some entries from the speculative cache storage region. In particular, the processing circuitry switching from a more privileged state to a less privileged state may trigger the speculative cache flush event. Hence, by avoiding pollution of the main cache region with entries associated with unresolved speculative memory accesses, and discarding entries from the speculative cache storage region if there is a reduction in the privilege level of the processing circuitry, this may provide a counter-measure against the less privileged code being able to use cache timing side-channels to probe information whose access is restricted to the more privileged code executed before the change of privilege level.

Another example of a speculative cache flush event may be the processing of a speculative cache flush instruction by the processing circuitry. By providing a speculative cache flush instruction which can be used to trigger discarding of any entries relating to still to be resolved of incorrectly speculated memory accesses from the speculative cache storage region, this can allow a programmer to explicitly mark a point in the code beyond which it may be unsafe to enable visibility of information about cache allocations caused by speculative instructions. For example the programmer could include the speculative cache flush instruction at the end of a piece of code used to process sensitive information so that any subsequent code cannot gain side-channel information which could enable them to deduce the sensitive information. In some cases, the speculative cache flush instruction could be an instruction which also provides another effect, such as an exception return instruction which triggers a return to a lower level of privilege, which can also be interpreted as triggering flushing of still-to-be-resolved or resolved-as-incorrect entries of the speculative cache storage region.

However, it can be useful to provide a dedicated speculative cache flush instruction which does not provide any other effect at an architectural level (i.e. an instruction which behaves as an architectural no-operation (nop) instruction), but which triggers the cache control circuitry to discard, from the speculative cache storage region, at least the entries allocated by still-to-be-resolved or resolved-as-incorrect memory accesses (or in some cases, which triggers all entries of the speculative cache storage region to be discarded). This allows the programmer/compiler to mark (even if no other change of privilege level or architectural effect is required) a boundary in code beyond which any speculatively allocated entries should be discarded from cache, to provide further confidence that subsequently executed code cannot gain side-channel information from measuring cache access timings.

When an entry is discarded from the speculative cache storage region, if the data associated with the entry is clean then that entry can simply be invalidated. However, sometimes the data stored in an entry of the speculative cache storage region may be dirty when the entry needs to be discarded. In some cases when a speculative memory access is performed, instead of needing to fetch the corresponding data from main memory, if the data was already available in another cache within the same processing system, such as a cache associated with another processor core or other master device, then the data may be written into the speculative cache storage region from that other cache. In this case, the data migrated into the speculative cache storage could already have been dirty when it was in the other cache and may not yet have been written back to memory, and so even if the processing circuitry which accesses the speculative cache storage region has not yet updated the data, the data in the speculative cache storage region may still be dirty. Hence, if the entry allocated to the speculative cache storage was simply invalidated there could be a risk that the most up-to-date copy of data from a given address could be lost. Therefore, on discarding an entry from the speculative cache storage region, the cache control circuitry may check whether the data stored in the entry is dirty and if so write the data to a further location.

The further storage location (to which the data of an entry discarded from the speculative cache storage region is written back) could be a further level cache or memory. Alternatively, the further storage location could be a location from which the data was originally obtained in response to the speculative memory access which triggered allocation of the entry to the speculative cache storage region. For example this other location could be a cache in another processor core or master device as discussed above. By returning or restoring the data in a discarded speculative entry to the location from which it was originally obtained, then this means that following resolution of a memory access as incorrectly speculated, the pattern of addresses allocated in caches across the system as a whole may be closer to the pattern which would have been present had the speculative memory access not been executed at all, reducing the chance for an attacker to derive information on the access patterns of the speculatively executed instructions by measuring cache timings in the further location (e.g. in the other processor core's cache). Hence, this can protect against second-order side-channels which can derive information from changes in coherency state or cache allocation patterns in another cache not directly accessed by the speculatively executed instructions. To enable the data to be restored to the location from which it was obtained, each entry of the speculative cache storage region may specify location metadata which is indicative of the location from which the data was obtained.

The speculative cache storage region may be implemented in different ways. In general, the speculative cache storage region may be a physically distinct cache storage region from the main cache storage region, so that the physical locations used to cache entries allocated in response to speculative memory accesses while those accesses remain speculative are distinct from those entries used to cache entries associated with non-speculative memory accesses or speculative memory accesses which have already been resolved. This means that when an allocation is made in response to a speculative memory access which is still unresolved, there is no need to discard a non-speculative value from the cache, as the physically distinct regions allocated for speculative and non-speculative entries mean that an allocation into the speculative cache storage region does not affect allocations already made in the main cache storage region. This can be useful, as some variants of the attack discussed above may gain side-channel insights from an analysis of which addresses have been discarded/evicted from the cache, not just from analysing which addresses have been allocated into the cache. Hence, providing physically distinct main and speculative cache storage regions can provide a more effective counter-measure against such attacks compared to an alternative approach of providing a single shared region which has entries which can be used for either speculative or non-speculative allocations, but where metadata stored in each entry distinguishes the speculative allocations from the non-speculative allocations.

In one example, the speculative cache storage region may comprise a separate cache storage structure to the main cache storage region. For example the main and speculative cache storage regions could have separate indexing, selection and/or tag comparison circuitry for selecting the location of the cache from which data having a given memory address should be read from or written to the cache. Hence, the main and speculative cache storage regions could have different indexing or tagging schemes. A benefit of having entirely separate cache storage structures for the main and speculative regions is that this allows the associativity, indexing or tagging schemes and the metadata provided for each entry to be designed in different ways for the main and speculative regions depending on the needs of those regions. For example the speculative region may typically only need to store relatively few entries which may be replaced reasonably often. In contrast the main storage region may be designed to handle a greater volume of data, but may use an allocation policy which may be more energy efficient for longer term storage.

For example the speculative cache storage region may have a higher associativity than the main cache storage region. That is, a data value associated with a given memory address may be restricted to being stored in a particular set of locations in the main cache storage region and cannot be stored outside those locations. In the speculative cache storage region there may be a greater number of possible locations at which a data value associated with a given address can be placed. In some implementations, the speculative cache storage region may be fully associative so that the data associated with any given address can be stored at any entry of the speculative cache storage region. In contrast the main cache storage region may be set-associative. This may exploit the fact that the speculative cache storage region may only need relatively few entries and by making it fully associative this avoids performance loss caused by cases where there is conflict between entries allocated in response to different speculatively executed memory operations which would correspond to the same set in a set-associative structure. In contrast for the main cache storage region as the total number of entries may be greater than for the speculative cache storage region, a set-associative allocation scheme can be more energy efficient as it means that fewer entries need to be looked up to compare address tags each time a cache is accessed in order to find which entry stores the data associated with a given address.

In other embodiments the speculative cache storage region could be implemented as a reserved portion of the same cache storage structure comprising the main cache storage region. For example, while the speculative cache storage region may still bel physically distinct from the main cache storage region, so that allocation into speculative cache storage region need not cause any discarding of non-speculative entries in the main cache storage region, they may form part of the same cache storage structure, for example with a common indexing/tagging scheme. For example the cache storage structure could comprise a set-associative cache, and the speculative cache storage region may comprise at least one reserved way of the cache storage structure.

An apparatus may have processing circuitry to perform speculative execution instructions and an instruction decoder to decode instructions to control the operation of the processing circuitry depending on the decoded instructions. The instruction decoder may be responsive to a speculative cache flush instruction to control the processing circuitry to discard or make inaccessible from a cache one or more speculative entries which were allocated to the cache in response to a speculative memory access which still remains unresolved or has been resolved as incorrect. By providing at an architectural level a type of instruction which the programmer can use to ensure that there will be no remaining speculative entries in the cache, this can help reduce vulnerability to the type of attack discussed above.

Figure 1:
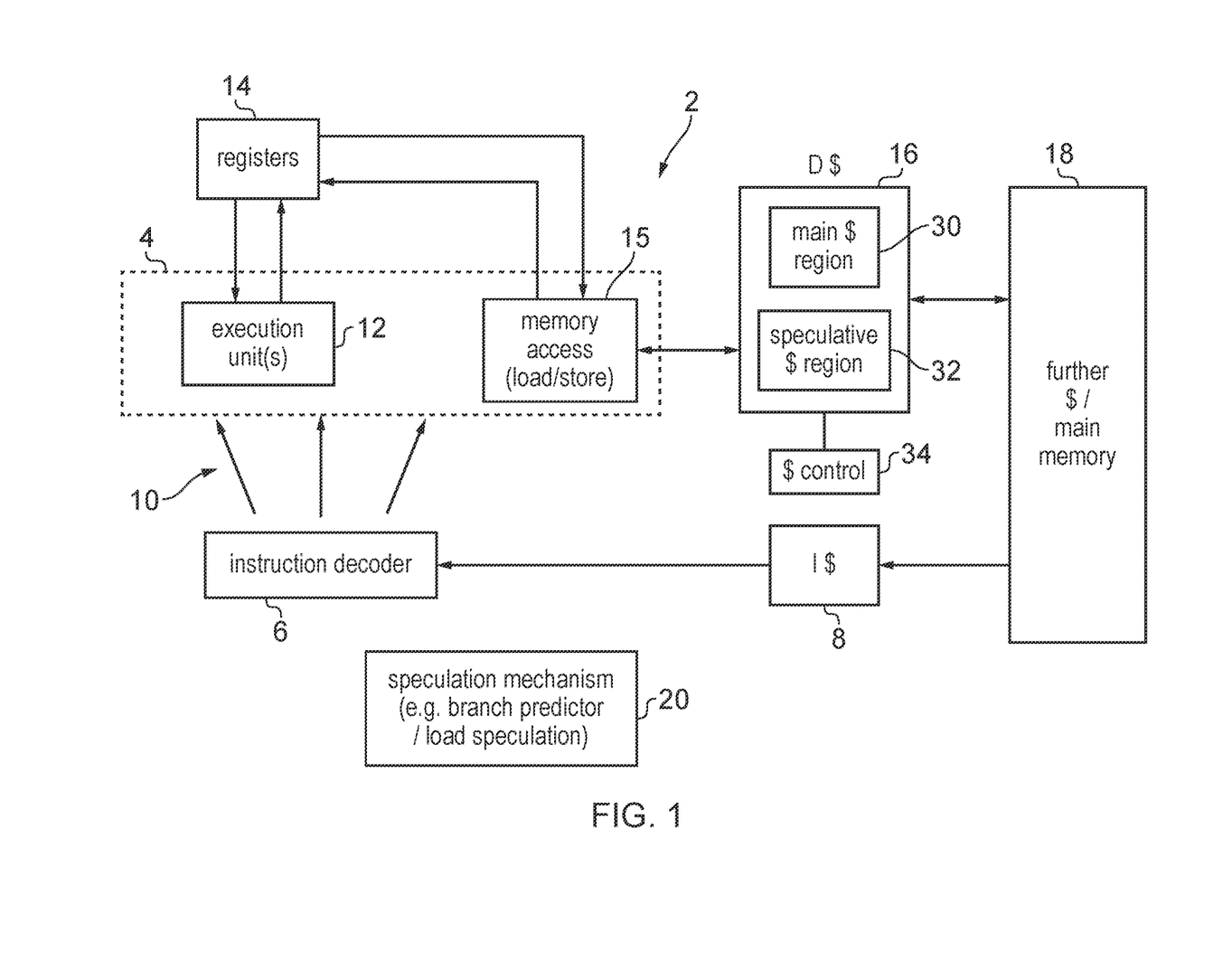
FIG. 1 schematically illustrates an example of a data processing apparatus having a main cache region and a speculative cache storage region.

FIG. 1 schematically illustrates an example of a data processing apparatus 2. I will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 includes one or more execution units 12 for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. The memory system includes the instruction cache 8, a data cache 16 and further storage provided downstream from the data cache 16 and instruction cache 8, such as further levels of cache (e.g. level 2 or level 3 caches) and main memory 18. In response to load operations the memory access circuitry 15 controls the memory system to return data associated with a given address and writes the loaded data to the registers 14. In response to store operations, values from the registers 14 are written to the memory system by the memory access circuitry 15.

As shown in FIG. 1, the apparatus 2 may have at least one form of speculation mechanism 20 for making a prediction about the expected behaviour of certain instructions to be processed by the processing circuitry 4 and controlling the apparatus to execute subsequent instructions speculatively depending on the predicted outcome of the earlier instructions. For example the speculation mechanism 20 could comprise a branch predictor for predicting taken/not taken outcomes of branch instructions and/or for predicting the target addresses of branch instructions so that subsequent instructions can be fetched, decoded and executed speculatively without needing to wait for the actual branch outcome to be resolved. If the branch prediction turns out to be incorrect, then the architectural effects of the subsequently executed speculative instructions on the registers 14 can be reversed and architectural state in the registers 14 can be restored to the point at which the branch was encountered, and then an alternative path of instructions can be executed following the branch. However if the branch is correctly predicted then by filling the pipeline with subsequent instructions earlier, this enables performance to be improved.

Another example of a speculation mechanism 20 may be a load speculation unit which may predict the data which will be loaded from the memory system before it is actually returned, so that subsequent instructions can be executed speculatively using the predicted data value. If it later turns out that this prediction is incorrect then again subsequent speculative instructions can be cancelled and the architectural state in registers 14 restored to the point at which the speculated load was encountered.

Hence, such speculative execution of instruction by the processing circuitry 4 before it is actually known whether the inputs to those instructions are correct or whether those instructions needed to be executed at all, can be extremely beneficial in providing high processor performance. However, it has recently been recognised that if such speculation leads to memory accesses being performed speculatively, allocations into the cache 16 triggered by the speculative memory accesses may remain visible even after a speculative instruction has been resolved as mispredicted or incorrectly speculated and the architectural effects of the speculative re-executed instructions have been reversed. This can then allow subsequently executed code to investigate what data was loaded by earlier codes by using cache timing side-channels. The basic principle behind cache timing side-channels is that the pattern of allocations into the cache, and, in particular, which cache sets have been used for the allocation, can be determined by measuring the time taken to access entries that were previously in the cache, or by measuring the time to access the entries that have been allocated. This then can be used to determine which addresses have been allocated into the cache.

Speculation-based cache timing side-channels using speculative memory reads have recently been proposed. Speculative memory reads are typical of advanced microprocessors and part of the overall functionality which enables very high performance. By performing speculative memory reads to cacheable locations beyond an architecturally unresolved branch (or other change in program flow), and, further, using the result of those reads themselves to form the addresses of further speculative memory reads, these speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code, but the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1    struct array {
2        unsigned long length;
3        unsigned char data[ ];
4    };
5    struct array *arr = . . . ;
6    unsigned long untrusted_offset_from_user = . . . ;
7    if (untrusted_offset_from_user < arr->length) {
8        unsigned char value;
9        value =arr->data[untrusted_offset_from_user];
10       . . .
11   }
```

In a modern micro-processor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware.

However, advanced processors can use the values that have been speculatively loaded for further speculation. It is this further speculation that is exploited by the speculation-based cache timing side-channels. For example, the previous example might be extended to be of the following form:

```
1     struct array {
2         unsigned long length;
3         unsigned char data[ ];
4     };
5     struct array *arr1 = . . . ; /* small array */
6     struct array *arr2 = . . . ; /*array of size 0x400 */
7     unsigned long untrusted _offset_from user = . . .;
8         if (untrusted_offset_from_user < arr1->length) {
9             unsigned char value;
10            value =arr1->data[untrusted_offset_from_user];
11            unsigned long index2 =((value&1) *0x100)+0x200;
12            if (index2 < arr2->length) {
13                unsigned char value2 = arr2->data[index2];
14            }
15        }
```

In this example, "value", which is loaded from memory using an address calculated from arr1→data combined with the untrusted_offset_from user (line 10), is then used as the basis of a further memory access (line 13). Therefore, the speculative load of value2 comes from an address that is derived from the data speculatively loaded for value. If the speculative load of value2 by the processor causes an allocation into the cache, then part of the address of that load can be inferred using standard cache timing side-channels. Since that address depends on data in value, then part of the data of value can be inferred using the side-channel. By applying this approach to different bits of value, (in a number of speculative executions) the entirety of the data of value can be determined. Hence, the untrusted software can, by providing out-of-range quantities for untrusted_offset-_from_user, access anywhere accessible to the supervisory software, and as such, this approach can be used by untrusted software to recover the value of any memory accessible by the supervisory software.

Modern processors have multiple different types of caching, including instruction caches, data caches and branch prediction cache. Where the allocation of entries in these caches is determined by the value of any part of some data that has been loaded based on untrusted input, then in principle this side channel could be stimulated.

As a generalization of this mechanism, it should be appreciated that the underlying hardware techniques mean that code past a branch might be speculatively executed, and so any sequence accessing memory after a branch may be executed speculatively. In such speculation, where one value speculatively loaded is then used to construct an address for a second load or indirect branch that can also be performed speculatively, that second load or indirect branch can leave an indication of the value loaded by the first speculative load in a way that could be read using a timing analysis of the cache by code that would otherwise not be able to read that value. This generalization implies that many code sequences commonly generated will leak information into the pattern of cache allocations that could be read by other, less privileged software. The most severe form of this issue is that described earlier in this section, where the less privileged software is able to select what values are leaked in this way.

Figure 2:
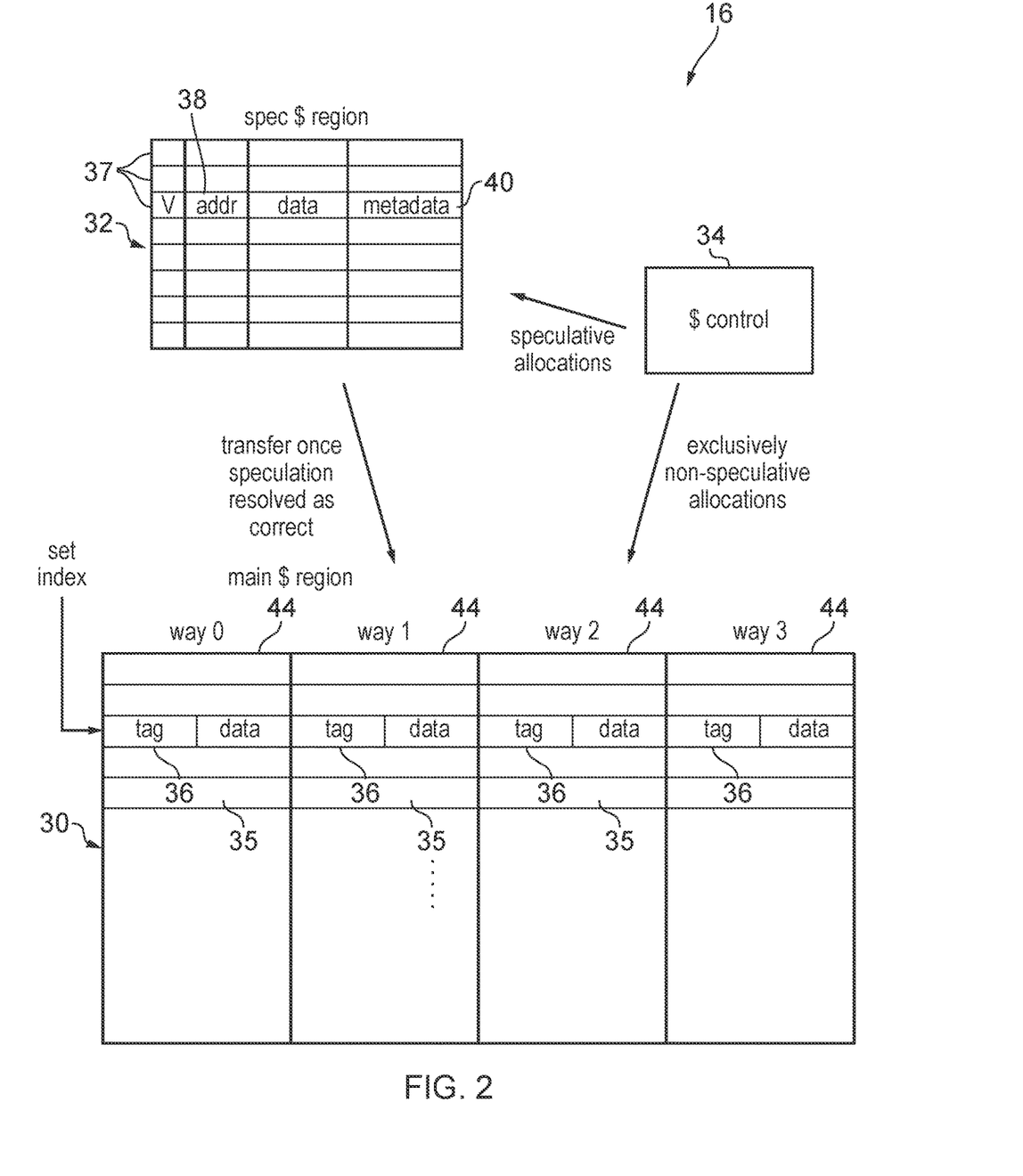
FIG. 2 illustrates an example implementation of the main and speculative cache storage regions.

Hence, it is desirable to provide counter-measures against this type of attack. As shown in FIG. 1, a cache, such as the level one data cache 16, may be provided with physically distinct main and speculative cache storage regions 30, 32, to help protect against the type of attack discussed above. FIG. 2 schematically illustrates an example of the main cache storage region 30 and speculative cache storage region 32 in more detail. Allocation to the caches is controlled by cache control circuitry 34. As shown in FIG. 2, the cache control circuitry 34 controls the allocations so that when allocations of entries to the cache 16 are triggered by a speculative memory access, then while the speculative memory access remains speculative, the allocation is made to the speculative cache region 32 instead of the main cache storage region 30. On the other hand allocations to the main cache storage region 30 are made exclusively in response to non-speculative memory accesses or in response to speculative memory accesses which have already been resolved as correct. Hence, this avoids the main cache region being polluted with entries which are still speculative or have been resolved as failing the speculation. Once a speculative memory access has been resolved as correct then an entry allocated to the speculative cache storage region 32 in response to that memory access can be transferred to the main cache region.

While processing remains at the same privilege level, then all the entries in both the main cache region 30 and the speculative cache region 32 may be accessible to read requests or load instructions. However, when certain flush events (e.g. events which could signal there is a risk of the type of attack discussed above) occur then entries may be discarded from the speculative cache region or otherwise made inaccessible, to prevent those speculative allocations being visible to code executed after the speculative cache flush event. For example such discards could be done in response to a reduction in privilege level of the processing circuitry 4. The processing circuitry 4 may operate in one of a number of privilege states associated with different rights to access data. In general, in a more privileged state, the processing circuitry 4 may have access to some data not accessible to the processing circuitry when operating in a less privileged state. For example the more privileged state could be a kernel-level (or operating system level) privilege state, while the less privileged state could be an application-level state in which the applications executed while in the application-privilege level may be excluded from accessing certain data which is accessible to the kernel-level. By discarding the contents of the speculative cache region 32 when there is a switch from a more privileged state to a less privileged state, e.g. on an exception return, this means that the less privileged code can then only see cache allocations made in response to non-speculative or resolved memory accesses, to avoid using the cache timing side-channels to investigate what entries were allocated by speculatively executed instructions in order to circumvent security protections provided by the privilege control mechanism.

In the example of FIG. 2, the main and speculative cache storage regions 30, 32 are implemented as completely separate cache storage structures which have different associativity and different cache indexing schemes. In this example the main cache storage region is set-associative (N-way set-associative, e.g. N=4 in this example). Hence, data associated with a particular address can only be placed at a set of N locations identified by a set index derived from the memory address, and each of the set of N locations includes tag information 36 identifying part of the address which can be compared with a corresponding tag portion of the address for which the data is sought when querying the cache, in order to determine whether any of the indexed set of entries actually stores data for that address.

In contrast, the speculative cache storage region 32 may be implemented as a relatively small buffer of, for example, 8 or 16 entries, and may be provided as a fully associative cache structure so that data for any address can be stored in any of the entries of the speculative cache storage region. In this case the full address 38 of the data associated with a given entry may be stored in the entry to enable a lookup of whether the speculative cache region stores any data corresponding to a required target address. A fully associative implementation for the speculative cache region could be more efficient to avoid set conflicts leading to data having to be discarded from the speculative cache storage region.

In the main cache storage region, each entry 35 may, in addition to the tag 36 and the stored data, also specify metadata (which is not explicitly indicated in FIG. 2) for controlling cache allocation or coherency. For example this metadata could include valid information specifying whether the entry is valid, coherency state information specifying a coherency state of the corresponding data, such as whether the data is clean or dirty or whether it is shared with caches in other masters in a larger processing system including the processor core 2 of FIG. 1), and/or eviction policy information for controlling which of a set of entries 35 is to be evicted if there is not an available entry ready to accept allocation of a new entry to the cache.

In contrast, for the speculative cache region the metadata 40 stored in each entry 37 may have a different form to the metadata in the main cache storage region. For example, as well as any of the metadata described above for the main cache region, entries 378 in the speculative cache region 32 could also store additional information such as speculation tracking information for tracking a correspondence between the entries of the speculative cache region 32 and a speculatively executed instruction (or block of speculatively executed instructions) processed by the processing circuitry 4. In some cases the metadata 40 could identify the particular address of the speculative load instruction which triggered the allocation of the entry 37 in the speculative cache region 32. However, in practice tracking on an individual instruction-by-instruction basis may be more complex than is justified and other implementations could track the speculation at a more coarse grained granularity. For example the metadata 40 could specify an identifier of a certain block of instructions (epoch) executed by the processing circuitry 4. When all of the instructions in a block are resolved as being correctly speculated then this may trigger the transfer, from the speculative cache storage region 32 to the main cache storage region 30, of any entries 37 of the speculative cache storage region 32 which are tagged with the identifier of the corresponding block of instructions.

In some cases the metadata 40 specified in an entry 37 of the speculative cache storage region 32 could also include information identifying a location from which the data in the entry 37 was obtained when it was loaded into the allocated entry. This location could be a further cache or main memory 18 as shown in FIG. 1, or in a multiprocessor system could also be a cache associated with a different processor core. For example a system could include multiple instances of a processor as shown in FIG. 1 or could include other masters with different configurations but which also comprise a cache. In this case the metadata 40 could specify the location of a particular cache from which the data was obtained so that if the entry 37 of the speculative cache storage region 32 needs to be discarded and the data in that entry is dirty, then that data can be written back to the location from which it was obtained rather than needing to be written back to main memory. In some cases this may be faster to perform. Also writing the data back to the location from which it came from can mean that there are fewer changes in the cache allocations in this other cache, which reduces the chance of attackers being able to derive information about the behaviour of incorrectly speculatively executed instructions from analysis of cache allocations in the system as a whole.

While FIG. 2 shows an embodiment in which the speculative cache region 32 is completely separate from the main cache region 30, another implementation could provide a single set associative structure as shown for the main region 30 of FIG. 2, but reserve at least one way 44 of the set associative structure for storing the speculatively allocated entries with the other ways 44 being used exclusively for non-speculative allocations. This can provide similar protection against the attacks discussed above.

In one example, the speculative cache region may be implemented as follows. Alongside the existing caches, a "speculation cache" 32 may be provided which holds memory accesses that are added speculatively. For example, the speculation cache may comprise a fully associative buffer N cache lines in size (e.g. N=8, 16 or 32) which behaves as another "cache way", but has the following properties:

1) Entries are allocated into this speculation cache as a result of speculative accesses, and they are tagged with the speculative epoch information indicating the block of instructions which caused the entry to be allocated; that is used for other memory accesses, or with any other metadata which enables a determination of whether accesses associated with the entries in the speculation cache 32 passed/failed their speculation or are still speculative 2) Items that pass their speculation can be allocated into the main cache 30.

3) Items that fail their speculation cannot be allocated into the main cache 30, but can remain until a change of exception level.

4) On a reduction in privilege (i.e. an exception return), the entries in the speculation cache 30 that fail their speculation are discarded (if they are clean) or are written back (if they are dirty—that latter case may be due to dirty lines migrating into the speculation cache 30 from other locations).

Figure 3:
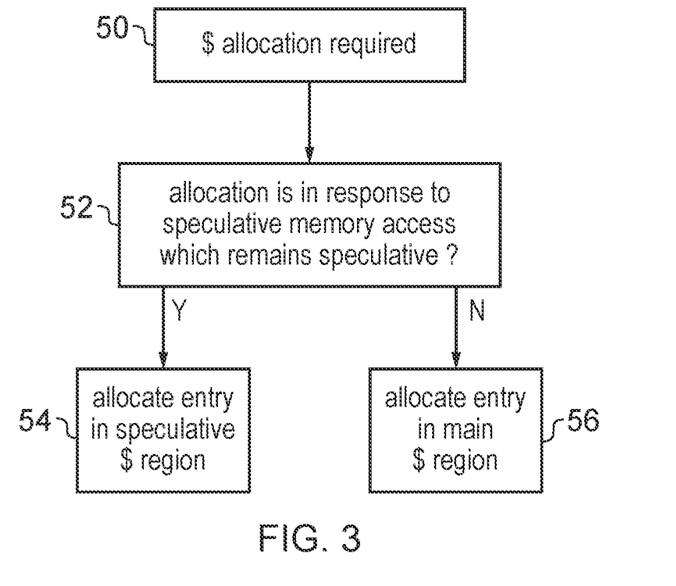
FIG. 3 is a flow diagram illustrating control of cache allocation.

FIG. 3 shows a flow diagram illustrating a method of controlling cache allocations. At step 50 the cache control circuitry 34 determines that an allocation of an entry into the cache is required, e.g. when a load instruction is encountered and so the memory access circuitry 15 makes a request for data to be loaded from a memory system, when the requested address is not already cached within the cache 16. At step 52 the cache control circuitry determines whether the allocation is in response to a speculative memory access which remains speculative. If so then at step 54 the entry is allocated into the speculative cache region 32. If the allocation is not in response to a speculative memory access which remains speculative then at step 56 the allocation is made into the main cache storage region 30.

Alternatively, in some embodiments, rather than attempting to determine, at the time of cache allocation, whether a memory access has been performed speculatively or not, the cache controller 34 can simply allocate any new entry into the speculative cache storage region initially, and then transfer the new entry to main cache storage region 30 once the corresponding memory access or block of instructions has been resolved as correctly predicted. In this case, the cache controller 34 may not be able to make any direct allocations of new entries to the main cache region 30 other than by transferring entries from the speculative cache region. Hence, even if some memory accesses are performed non-speculatively, they could still be allocated into the speculative cache storage region, but may relatively quickly be transferred to the main cache (e.g. as part of a block transfer) if they are already resolved as correct.

Figure 4:
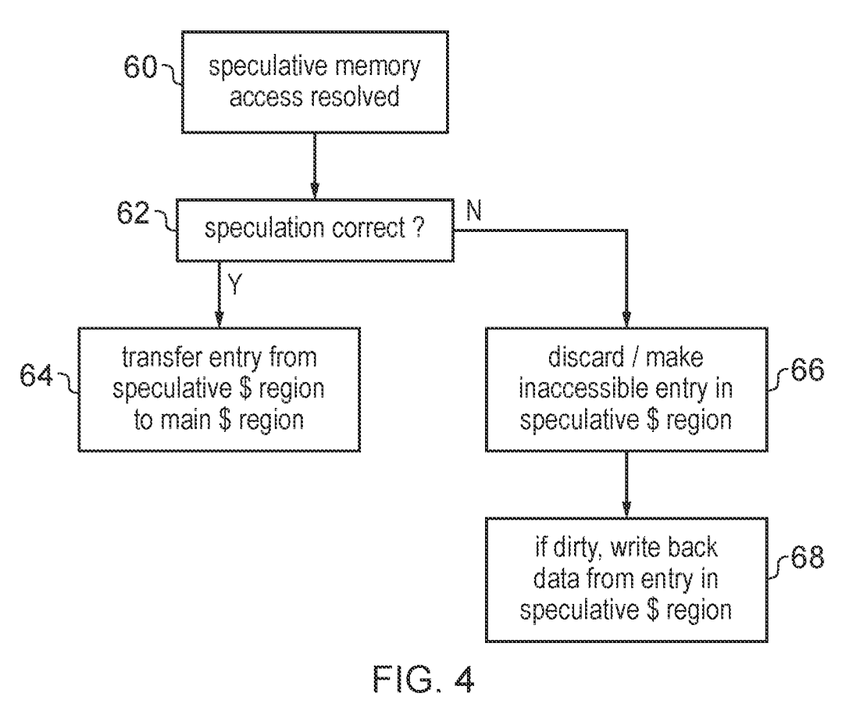
FIG. 4 is a flow diagram illustrating control of cache allocation after a speculative memory access has been resolved.

FIG. 4 shows a flow diagram illustrating functionality of the cache controller 34 once a speculative memory access has been resolved. At step 60 it is determined that a particular speculative memory access has been resolved. At step 62 it is determined whether the speculation was correct. If the speculation was correct then at step 64 an entry allocated into the speculative cache storage region 32 in response to the speculative memory access can be transferred from the speculative cache storage region 32 to the main cache storage region 30. This transfer could occur directly in response to determining that the speculation was correct, or could occur at some time later. For example instead of checking for every instruction whether the corresponding entry can be transferred, another approach could be to provide a periodic checking operation which is performed from time to time. When the checking operation is performed, the cache controller could step through each entry of the speculative cache region 32 to check whether it corresponds to a block of one or more instructions which have been completely resolved as correct and if so then any of those entries can be transferred to the main cache region 30 while entries relating to still to be resolved instructions could be retained within the speculative cache region.

On the other hand if at step 62 it is determined that the speculation which caused the speculative memory access has been resolved as incorrect, then at step 66 the entry associated with that memory access may be discarded or made inaccessible in the speculative cache storage region 32, without transferring it to the main cache region 30. When the entry is discarded or made inaccessible, if the data in that entry is indicated as dirty then at step 68 that data is written back to a further storage location, which could be the further level cache or main memory 18 or could be the location indicated in the metadata 40 as the location from which the data was obtained when the entry was allocated previously.

In an alternative implementation of the process of FIG. 4, step 66 and 68 could be omitted and there may be no need to actually discard entries of the speculative cache storage region 32 at the time when it is determined that certain speculatively executed instructions were incorrectly speculated. Even if entries remain in the speculative cache storage region 32 after the speculation has been resolved as incorrect, it is still possible that subsequent instructions may still need to access the same data. The risk of the type of attack discussed above may occur if the code subsequently switches to less privileged code or code which should not gain access to certain sensitive information. However, if despite the mis-speculation the code executed after the mis-speculation remains privileged or is allowed to have access to the sensitive information then there is no problem retaining the allocations associated with the incorrectly speculated instructions within the speculative cache region 32. In fact, retaining these entries may provide a performance benefit since even if there is mis-speculation it is still possible that subsequent instructions may attempt to access the same address location. Hence in some cases the discarding could be done not at the time of resolving speculative instructions, but in response to a separate flush event which could be triggered when there is a switch to a portion of code which should not have access to certain sensitive information.

Figure 5:
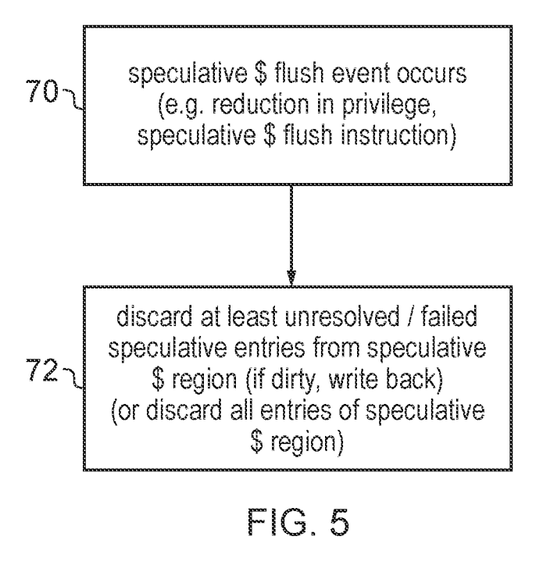
FIG. 5 is a flow diagram illustrating a response to a speculative cache flush event.

FIG. 5 of a flow diagram illustrating handling of such a flush event. At step 70 a speculative cache flush event occurs. For example this event could be a reduction in the privilege level at which the processing circuitry 4 is operating, e.g. an exception return or a switch from a privilege state to a less privileged state. Also another example of a flush event may be the execution of a speculative cache flush instruction by the processing circuitry 4. That is, the instruction decoder 6 may support an instruction set architecture which defines a certain subset of instructions as speculative cache flush instructions which, when they are executed may trigger the cache controller 34 to discard any entries of the speculative cache storage region 32 which relates to unresolved speculative memory accesses or memory accesses which were resolved as incorrectly speculated. This can allow a programmer or compiler to explicitly mark the point in code at which the speculative allocation should be discarded from the cache to avoid subsequent code gaining insight into the operation of the previously executed code through the side-channel method discussed above. For example, the speculative cache flush instruction may be a dedicated instruction having no other architectural effect, i.e. an architectural NOP instruction.

In response to the speculative cache flush event occurring at step 70, at step 72 the cache controller 34 controls the cache 16 to discard at least those entries 37 which were allocated in response to speculative memory accesses which remain unresolved or which have already been resolved as failed (incorrectly speculated). In some cases only such unresolved or failed speculative entries may be discarded and entries which relate to memory accesses which have been resolved as correct need not be discarded (e.g. the periodic sweep to check for entries to transfer to the main cache region 30 may not yet have been performed since those entries were resolved as correct). However, in practice the overhead associated with checking for whether entries are resolved or unresolved may be unjustified, and a simpler approach may be to discard all the entries of a speculative cache region 32 in response to the speculative cache flush event. Regardless of whether all the entries are discarded or only those unresolved or failed entries, if the data in a discarded entry is dirty then again a write back to a further storage location may be performed similar to step 68 of FIG. 4.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Further example arrangements are set out in the following clauses:

(1) An apparatus comprising:
processing circuitry to perform speculative execution of instructions;
a main cache storage region;
a speculative cache storage region; and
cache control circuitry to allocate an entry, for which allocation is caused by a speculative memory access triggered by the processing circuitry, to the speculative cache storage region instead of the main cache storage region while the speculative memory access remains speculative.

(2) The apparatus of clause 1, in which the cache control circuitry is configured to exclusively allocate to the main cache storage region entries corresponding to non-speculative memory accesses or speculative memory accesses which have been resolved as correct.

(3) The apparatus of any of clauses 1 and 2, in which both the main cache storage region and the speculative cache storage region are accessible in response to reads triggered by speculative instructions executed by the processing circuitry.

(4) The apparatus of clause 3, in which in response to the processing circuitry switching from a more privileged state to a less privileged state, the cache control circuitry is configured to discard entries of the speculative cache storage region or make the entries of the speculative cache storage region inaccessible to the processing circuitry.

(5) The apparatus according to any preceding clause, in which the cache control circuitry is configured to transfer an entry allocated in response to a speculative memory access from the speculative cache storage region to the main cache storage region after the speculative memory access has been resolved as correct.

(6) The apparatus of clause 5, in which the cache control circuitry is configured to transfer the entry allocated in response to the speculative memory access to the main cache storage region directly in response to detection that the speculative memory access has been resolved as correct.

(7) The apparatus of clause 5, in which the cache control circuitry is configured to periodically perform a speculative cache transfer operation to determine whether any entries of the speculative cache storage region correspond to resolved speculative memory accesses which have been resolved as correct, and transfer the entries corresponding to the resolved speculative memory accesses to the main cache storage region.

(8) The apparatus of any preceding clause, in which the cache control circuitry is configured to discard an entry of the speculative cache storage region associated with a speculative memory access resolved as incorrect.

(9) The apparatus of any preceding clause, in which the cache control circuitry is responsive to a speculative cache flush event to discard at least entries of the speculative cache storage region which are associated with one of:
a speculative memory access resolved as incorrect; and
a speculative memory access still to be resolved.

(10) The apparatus of clause 9, in which the cache control circuitry is responsive to the speculative cache flush event to discard all entries of the speculative cache storage region.

(11) The apparatus of any of clauses 9 and 10, in which the speculative cache flush event comprises the processing circuitry switching between a more privileged state and a less privileged state.

(12) The apparatus of any of clauses 9 and 10, in which the speculative cache flush event comprises the processing circuitry switching from a more privileged state to a less privileged state.

(13) The apparatus of any of clauses 9 to 12, in which the speculative cache flush event comprises processing of a speculative cache flush instruction by the processing circuitry.

(14) The apparatus of any of clauses 8 to 13, in which on discarding an entry of the speculative cache storage region, the cache control circuitry is configured to determine whether data in the discarded entry is dirty, and when the data is dirty, to write the data to a further storage location.

(15) The apparatus of clause 14, in which the further storage location comprises a further level cache or memory.

(16) The apparatus of clause 14, in which the further storage location comprises a location from which the data was obtained in response to the speculative memory access which triggered allocation of the entry to the speculative cache storage region.

(17) The apparatus of clause 16, in which each entry of the speculative cache storage region specifies location metadata indicative of the location from which the data was obtained.

(18) The apparatus of any preceding clause, in which the speculative cache storage region comprises a separate cache storage structure to the main cache storage region.

(19) The apparatus of any preceding clause, in which the speculative cache storage region has a higher associativity than the main cache storage region.

(20) The apparatus of clause 19, in which the speculative cache storage region is fully associative.

(21) The apparatus of any of clause 1 to 16, in which the speculative cache storage region comprises a reserved portion of the same cache storage structure comprising the main cache storage region.

(22) The apparatus of clause 21, in which the cache storage structure is set-associative and the speculative cache storage region comprises at least one reserved way of the cache storage structure.

(23) A method for an apparatus comprising processing circuitry to perform speculative execution of instructions; a main cache storage region; and a speculative cache storage region, comprising:
in response to a speculative memory access triggered by the processing circuitry, allocating an entry to the speculative cache storage region instead of the main cache storage region while the speculative memory access remains speculative.

(24) An apparatus comprising:
processing circuitry to perform speculative execution of instructions;
an instruction decoder to decode instructions to control operation of the processing circuitry depending on the decoded instructions; in which:
the instruction decoder is responsive to a speculative cache flush instruction to control the processing circuitry to discard or make inaccessible, from a cache, one or more speculative entries allocated to the cache in response to a speculative memory access which still remains unresolved or has been resolved as incorrect.

(25) A data processing method comprising:
decoding instructions to control operation of processing circuitry depending on the decoded instructions;
performing speculative execution of instructions using the processing circuitry; and
in response to decoding of a speculative cache flush instruction, controlling the processing circuitry to discard or make inaccessible, from a cache, one or more speculative entries allocated to the cache in response to a speculative memory access which still remains unresolved or has been resolved as incorrect.

The invention claimed is:

1. An apparatus comprising:
processing circuitry to perform speculative execution of instructions;
a main cache storage region;
a speculative cache storage region; and
cache control circuitry to allocate an entry, for which allocation is caused by a speculative memory access triggered by the processing circuitry, to the speculative cache storage region instead of the main cache storage region while the speculative memory access remains speculative, in which:
when the speculative memory access which triggered allocation of the entry to the speculative cache storage region is a speculative load memory access for loading data from a memory system, the entry allocated to the speculative cache storage region in response to the speculative load memory access specifies the data loaded from the memory system;
the cache control circuitry is configured to transfer an entry allocated in response to a speculative memory access from the speculative cache storage region to the main cache storage region after the speculative memory access has been resolved as correct; and
following the processing circuitry switching from a more privileged state to a less privileged state, the cache control circuitry is configured to:
permit the processing circuitry in the less privileged state to access entries stored in the main cache storage region which were allocated to the main cache storage region entries corresponding to non-speculative memory accesses or speculative memory accesses which have been resolved as correct, said entries stored in the main cache storage region remaining accessible following the processing circuitry switching from the more privileged state to the less privileged state; and
prevent the processing circuitry in the less privileged state from accessing entries stored in the speculative cache storage region which were allocated to the speculative cache storage region while operating in the more privileged state.

2. The apparatus of claim 1, in which the cache control circuitry is configured to exclusively allocate to the main cache storage region the entries corresponding to non-speculative memory accesses or speculative memory accesses which have been resolved as correct.

3. The apparatus of claim 1, in which both the main cache storage region and the speculative cache storage region are accessible in response to reads triggered by speculative instructions executed by the processing circuitry.

4. The apparatus of claim 3, in which in response to the processing circuitry switching from the more privileged state to the less privileged state, the cache control circuitry is configured to discard entries of the speculative cache storage region or make the entries of the speculative cache storage region inaccessible to the processing circuitry.

5. The apparatus of claim 1, in which the cache control circuitry is configured to transfer the entry allocated in response to the speculative memory access to the main cache storage region directly in response to detection that the speculative memory access has been resolved as correct.

6. The apparatus of claim 1, in which the cache control circuitry is configured to periodically perform a speculative cache transfer operation to determine whether any entries of the speculative cache storage region correspond to resolved speculative memory accesses which have been resolved as correct, and transfer the entries corresponding to the resolved speculative memory accesses to the main cache storage region.

7. The apparatus of claim 1, in which the cache control circuitry is configured to discard an entry of the speculative cache storage region associated with a speculative memory access resolved as incorrect.

8. The apparatus of claim 1, in which the cache control circuitry is responsive to a speculative cache flush event to discard at least entries of the speculative cache storage region which are associated with one of:
a speculative memory access resolved as incorrect; and
a speculative memory access still to be resolved.

9. The apparatus of claim 8, in which the cache control circuitry is responsive to the speculative cache flush event to discard all entries of the speculative cache storage region.

10. The apparatus of claim 8, in which the speculative cache flush event comprises the processing circuitry switching between the more privileged state and the less privileged state.

11. The apparatus of claim 8, in which the speculative cache flush event comprises the processing circuitry switching from the more privileged state to the less privileged state.

12. The apparatus of claim 8, in which the speculative cache flush event comprises processing of a speculative cache flush instruction by the processing circuitry.

13. The apparatus of claim 7, in which on discarding an entry of the speculative cache storage region, the cache control circuitry is configured to determine whether data in the discarded entry is dirty, and when the data is dirty, to write the data to a further storage location.

14. The apparatus of claim 13, in which the further storage location comprises a further level cache or memory.

15. The apparatus of claim 13, in which the further storage location comprises a location from which the data was obtained in response to the speculative memory access which triggered allocation of the entry to the speculative cache storage region.

16. The apparatus of claim 15, in which each entry of the speculative cache storage region specifies location metadata indicative of the location from which the data was obtained.

17. The apparatus of claim 1, in which the speculative cache storage region comprises a separate cache storage structure to the main cache storage region.

18. The apparatus of claim 1, in which the speculative cache storage region has a higher associativity than the main cache storage region.

19. The apparatus of claim 18, in which the speculative cache storage region is fully associative.

20. The apparatus of claim 1, in which the speculative cache storage region comprises a reserved portion of the same cache storage structure comprising the main cache storage region.

21. The apparatus of claim 20, in which the cache storage structure is set-associative and the speculative cache storage region comprises at least one reserved way of the cache storage structure.

22. A method for an apparatus comprising processing circuitry to perform speculative execution of instructions; a main cache storage region; and a speculative cache storage region, comprising:
in response to a speculative memory access triggered by the processing circuitry, allocating an entry to the speculative cache storage region instead of the main cache storage region while the speculative memory access remains speculative, in which:

when the speculative memory access which triggered allocation of the entry to the speculative cache storage region is a speculative load memory access for loading data from a memory system, the entry allocated to the speculative cache storage region in response to the speculative load memory access specifies the data loaded from the memory system;

and the method comprises:

transferring an entry allocated in response to a speculative memory access from the speculative cache storage region to the main cache storage region after the speculative memory access has been resolved as correct; and following the processing circuitry switching from a more privileged state to a less privileged state:

permitting the processing circuitry in the less privileged state to access entries stored in the main cache storage region which were allocated to the main cache storage region entries corresponding to non-speculative memory accesses or speculative memory accesses which have been resolved as correct, said entries stored in the main cache storage region remaining accessible following the processing circuitry switching from the more privileged state to the less privileged state; and preventing the processing circuitry in the less privileged state from accessing entries stored in the speculative cache storage region which were allocated to the speculative cache storage region while operating in the more privileged state.

23. An apparatus comprising:

processing circuitry to perform speculative execution of instructions;

an instruction decoder to decode instructions to control operation of the processing circuitry depending on the decoded instructions; in which:

the instruction decoder is responsive to a speculative cache flush instruction included in a sequence of instructions to be executed by the processing circuitry, to control the processing circuitry to discard or make inaccessible, from a cache, one or more speculative entries allocated to the cache in response to a speculative memory access which still remains unresolved or has been resolved as incorrect, said speculative cache flush instruction being a type of instruction to mark a point beyond which the speculative entries are to be discarded or made inaccessible.

24. A data processing method comprising:

decoding instructions to control operation of processing circuitry depending on the decoded instructions;

performing speculative execution of instructions using the processing circuitry; and in response to decoding of a speculative cache flush instruction included in a sequence of instructions to be executed by the processing circuitry, controlling the processing circuitry to discard or make inaccessible, from a cache, one or more speculative entries allocated to the cache in response to a speculative memory access which still remains unresolved or has been resolved as incorrect, said speculative cache flush instruction being a type of instruction to mark a point beyond which the speculative entries are to be discarded or made inaccessible.

* * * * *